United States Patent [19]

Brommer

[11] Patent Number: 5,099,248
[45] Date of Patent: Mar. 24, 1992

[54] TRANSMISSION SIGNAL DIRECTION FINDING APPARATUS AND METHOD

[75] Inventor: Karl D. Brommer, Hampton Falls, N.H.

[73] Assignee: Lockheed Sanders, Inc., Nashua, N.H.

[21] Appl. No.: 669,839

[22] Filed: Mar. 15, 1991

[51] Int. Cl.$^5$ .............................................. G01S 5/02
[52] U.S. Cl. .................... 342/430; 342/423; 342/424; 342/442; 342/445
[58] Field of Search ............. 342/423, 430, 442, 445, 342/424

[56] References Cited

U.S. PATENT DOCUMENTS

| | | | |
|---|---|---|---|
| 3,149,334 | 9/1964 | Cleaver et al. | 342/430 |
| 3,167,773 | 1/1965 | Byatt | 342/424 |
| 3,392,391 | 7/1968 | Royal | 342/430 |
| 4,528,567 | 7/1985 | Miles et al. | 342/442 |

Primary Examiner—Mark Hellner
Attorney, Agent, or Firm—David W. Gomes

[57] ABSTRACT

An apparatus and method for determining the direction of origin of a received transmission signal using a spinning antenna pair generally provides the steps and apparatus for measuring the phase difference between signals simultaneously received, coarsely approximating the direction of origin of the transmission signal, reconstructing a phase difference signal using the measured phase differences and a calculated signal based upon the coarse approximation, correcting the reconstructed phase signal based upon the first derivatives of the reconstructed signal and the calculated signal, and determining the direction of origin based upon the corrected reconstructed phase signal.

15 Claims, 5 Drawing Sheets

TRANSMISSION SIGNAL DIRECTION FINDING APPARATUS AND METHOD

BACKGROUND OF THE INVENTION

1. Field of the Invention

This invention generally relates to direction finding for transmission signals and, in particular to such apparatuses and methods which receive the transmission signals using a spinning antenna pair.

2. Statement of the Prior Art

The direction finding of transmission signals has been practiced for many year and has been achieved using a wide variety of antenna configurations and signal processing techniques. One such antenna configuration is a circular array of matched antennas which simultaneously receive the transmission signal. The simultaneously received signals from each antenna are processed to determine the relative phase of the received signals between antennas and therefrom determine the direction of origin.

One adaptation of the circular array is a spinning pair of antennas which are repeatedly simultaneously sampled throughout their rotation as a substitute for a full circular array. One of the problems associated with this approach is the spacing of the antenna pair compared to the wavelength of the transmission signal for the purpose of providing a sufficiently large phase measurement for accurate direction determination. This in turn causes a related problem requiring the use of a sufficiently large number of transmission signal samples in order to provide unambiguous phase measurements over the large number of full cycle phase changes during the sampling rotation of the antenna pair.

SUMMARY OF THE INVENTION

Accordingly, it is an object of the present invention to provide an apparatus and method for direction finding a transmission signal using a spinning antenna pair.

It is a further object of the present invention to provide such apparatus and method having the accuracy provided by a large phase difference measurement.

It is a still further object to provide the above accuracy while enabling fewer samples to be taken along the arc of antenna rotation and while avoiding the problems of ambiguous phase measurements.

In one form of the present invention, a method for determining the direction of origin of a received transmission signal using the phase differences provided by receiving the signal with a spinning pair of antennas begins with the step of measuring the phase difference between the signals received simultaneously by a spinning antenna pair for a single transmission signal, at a predetermined number of approximately evenly spaced angular positions within a revolution of the spinning antenna pair. Next, the direction of origin of the transmission signal is coarsely approximated based upon the measured phase differences and a first phase difference signal is calculated based upon the coarsely approximated direction. Using the phase differences measured from the antenna pair and the calculated phase difference signal a phase difference signal is reconstructed. Subsequently, the first time derivatives of the reconstructed phase signal and the calculated phase signal are determined and the reconstructed phase signal is corrected in response to a comparison between those first derivatives. Finally, the direction of origin of the transmission signal is finely determined based upon the corrected reconstructed phase signal.

In a refinement of this form, a second phase signal is calculated based upon the finely determined direction and the error of the finely determined direction is determined by comparing the corrected reconstructed phase signal against the second calculated phase signal. Unless the determined error of the finely determined direction is below a predetermined threshold value, the previous steps from the first step of calculating a first phase signal are repeated, based upon an adjusted approximated direction.

Another form of the present invention provides an apparatus for determining the direction of origin of a transmission signal, comprising means for receiving a transmission signal with a spinning antenna pair, means for measuring the phase difference between signals received simultaneously by the antenna pair at a predetermined number of approximately evenly spaced angular positions within a revolution of the spinning antenna pair, means for coarsely approximating the direction of origin of the transmission signal, means for calculating a first phase difference signal based upon the approximated direction, means for reconstructing a phase difference signal using the phase differences measured from the antenna pair and the first calculated first phase difference signal, means for determining the first time derivatives of the reconstructed phase signal and the calculated first phase signal, means for correcting the reconstructed phase signal in response to a comparison between the first derivatives of the reconstructed phase signal and the calculated first phase signal, and means for finely determining the direction of origin of the transmission signal based upon the corrected reconstructed phase signal.

A refined version further comprises means for calculating a second phase signal based upon the finely determined direction of origin, means for determining the error of the finely determined direction including means for comparing the corrected reconstructed phase signal against the second calculated phase signal, and means for providing to the means for calculating a first phase signal, an adjusted coarsely approximated direction unless the determined error of the finely determined direction is below a predetermined threshold value.

Yet another form of the present invention provides an apparatus for determining the direction of origin of a transmission signal, comprising means for receiving a transmission signal with a spinning antenna pair, means for simultaneously sampling signals received by the antenna pair, and programmed computational means coupled to receive the sampled signals. The programmed computational means includes instructional means for measuring the phase difference between the signals received simultaneously by a spinning antenna pair for a single transmission signal, at a predetermined number of approximately evenly spaced angular positions within a revolution of the spinning antenna pair; coarsely approximating the direction of origin of the transmission signal based upon the measured phase differences; calculating a first phase difference signal based upon the coarsely approximated direction; reconstructing a phase difference signal using the phase differences measured from the antenna pair and the calculated phase difference signal; determining the first time derivatives of the reconstructed phase signal and the calculated phase signal; correcting the reconstructed phase signal in response to a comparison between the first derivatives of the reconstructed phase signal and the calculated phase signal; and finely determining the direction of origin of the transmission signal based upon the corrected reconstructed phase signal.

BRIEF DESCRIPTION OF THE DRAWINGS

The present invention is illustratively described in reference to the accompanying drawings of which.

DETAILED DESCRIPTION OF THE DRAWINGS

Figure 1:
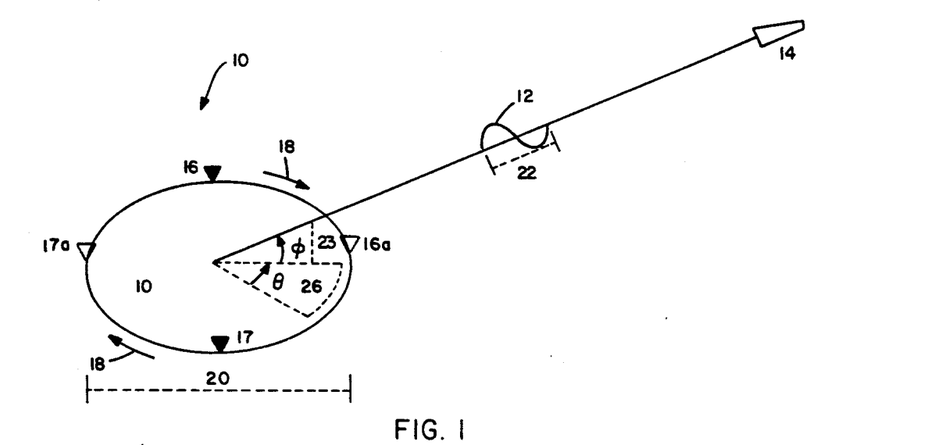
FIG. 1 is a diagram of a spinning antenna pair being used to receive a transmission signal.

The diagram of FIG. 1 shows a spinning antenna pair 10 being used to receive a narrow band transmission signal 12 originating from a source 14. Spinning antenna pair 10 is shown having a pair of antennas 16,17 with arrows 18 indicating the direction of rotation and being oriented in a first position with respect to the incoming transmission signal 12. The antennas 16,17 are also shown in another position 16a,17a of their rotation which other position varies from the first position with respect to the incoming transmission signal 12.

Transmission signal 12 is shown as a sine wave which depicts the amplitude of the transmission signal voltage as it propagates. When the spinning antenna pair 10 are located in the first position of antennas 16,17, the transmission signal received by each will have the same phase and the resultant phase difference will be zero. When the antenna pair 10 is in the second position 16a,17a, the signals received by each of the antennas will have a different phase, which when measured and subtracted to find the phase difference, will represent the largest possible phase difference between the antenna pair for a transmission signal at this particular wavelength.

The maximum possible phase difference in radians between the signals received by the antenna pair is determined by the distance 20 between the antennas relative to the wavelength 22 and the angle phi of elevation 23. The distance 20 between antenna positions 16a,17a, multiplied by 2pi and divided by the wavelength 22 determines the maximum phase difference possible at wavelength 22. In the embodiment shown, the distance 20 is approximately four (4) times the wavelength 22; so the maximum phase difference between the measured elements is 8pi radians. The phase difference also varies in response to the angle phi of elevation 23 between the signal source 14 and the imaginary plane of rotation of the antenna pair 10. When the elevation 23 is zero, the phase difference is at a maximum, and when the elevation 23 is greatest, the source 12 being directly over the antenna pair 10, the phase difference between the received antenna signals is zero.

Figure 2:
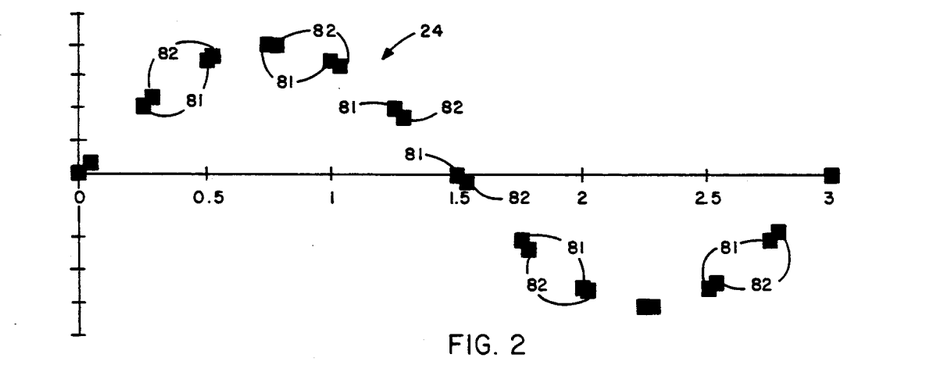
FIG. 2 is a graph of phase differences in reference to the rotational position of the antenna pair of FIG. 1.

As a result of the constant rotation of the antenna pair 10, the phase difference measured from the signals received by the antennas varies in accordance with a sine wave 24 shown in FIG. 2. This is depicted with the angular position of antenna rotation with respect to the received transmission signal shown along the horizontal axis and the phase difference between the received signals shown along the vertical axis. The first position of antennas 16,17 of FIG. 1 is the zero point of the horizontal axis, and the second antenna position 16a,17a is the pi/2 position on the horizontal axis. The pi position on the horizontal axis represents the position reversal of antennas 16,17 and the 3pi/2 position on the horizontal axis represents the reversal of antenna position 16a,17a.

Also shown in FIG. 2 is a maximum possible phase difference between the received signals of 8pi radians. It can be readily appreciated that the angular position theta 26 of the incoming transmission signal 12 can be determined by the location of sine wave 24 along the horizontal axis. It is also significant that given the influence of noise on received signals and the need to allow for elevation 23 of the signal source 14, having a high measurable phase difference between the antenna pair will provide a higher degree of accuracy in determining the position and amplitude of sine wave 24 and thus the angular position theta 26 and phi 23 of the incoming transmission signal 12.

Unfortunately, the only phase difference which can be measured between any pair of antennas is constrained between plus and minus (+/−) pi because the phase measurement is simply made between two received sine waves with one acting as a reference for the other. In circumstances where the antennas are separated by multiples of the wavelength, a great many samples must be taken in order to accurately track the phase difference throughout its range of multiple wavelengths. Only by tracing multiple instantaneous samples within each wavelength of the transmission signal is it possible to accurately count the number of wavelength changes which occur during a full antenna rotation. Thus, the number of samples required is directly dependent upon frequency, further compounding the problem. The problem thus created is illustrated in FIG. 3.

Figure 3:
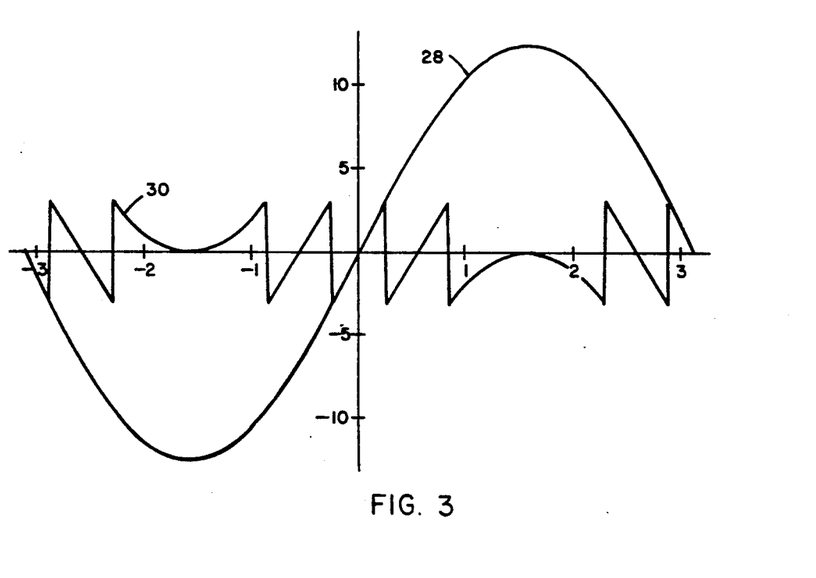
FIG. 3 is a graph of both actual and measured phase differences for an antenna pair similar to that shown in FIG. 1.

FIG. 3 is similar to FIG. 2 in that it shows phase difference along the vertical axis and the rotational antenna position with respect to the received transmission signal along the horizontal axis. The curve 28 shows the actual phase difference between signal received by an antenna pair 10 having a spacing of 12pi radians of phase of the receiver tuning frequency or six (6) times the signal wavelength. The curve 30 represents the phase difference measurement made between the receiving elements. Whenever the phase measurement exceeds plus or minus pi, 2pi is effectively subtracted or added, respectively, from or to the measurement thereby constraining it. Thus in order to use the signal phase differences from such a spinning pair it is necessary to reconstruct the curve 28 from the measured differences 30.

The ability to accurately perform reconstruction of the actual phase difference 30 from the measured phase difference 28 depends upon the number of samples of curve 28 which are available or, in other words, the number of phase difference measurements available. In addition, the number of samples required increases with the ratio of antenna separation 20 to wavelength 22. This ratio increases with the frequency of the transmission signal, and as it increases so does the number of times that +/− 2pi is effectively added to the measurement. The net result of these factors is that high accuracy for high and low frequency transmission signals from the same antenna pair requires a very high number of samples of the received signal.

For purposes of economy, the present invention reduces the number of samples necessary for high accuracy direction determinations. It does this by providing reconstruction of the actual phase difference signal 30 using a smaller number of samples of the curve 28 or, in other words a smaller number of phase difference measurements, than would normally be required.

Figure 4:
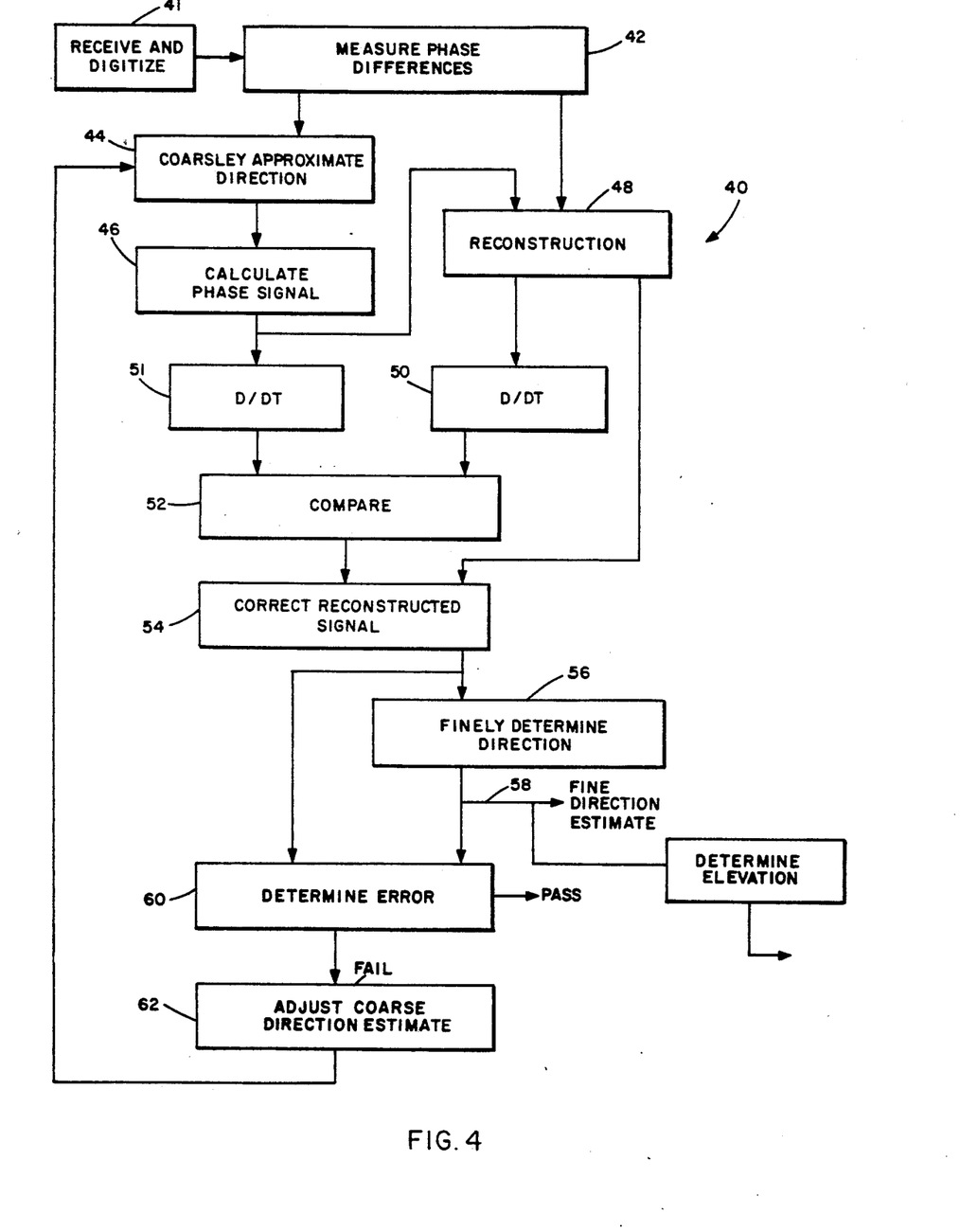
FIG. 4 is a flow chart of the signal processing method used by one embodiment of the present invention.

The method of one embodiment of the present invention is depicted in the flow chart of FIG. 4. The calculation or signal processing steps of the present invention may be implemented as either a dedicated computational circuit or as a programmed computer once the transmission signal has been received and digitized. For this reason the flow chart of FIG. 4 represents both a general schematic block diagram of a signal processing system performing the processing steps of that embodiment and a flow chart for a suitable computer program.

The flow chart of FIG. 4 shows an overall method 40 which begins with the step 41 of receiving and digitizing the transmission signal using a spinning pair of antennas. The digitized signals are then used in step 42 for measuring instantaneous phase differences between the two antennas at a predetermined number of approximately evenly spaced angular positions within a revolution of the spinning antenna pair. Using these measured phase differences, step 44 coarsely approximates the direction of origin of the transmission signal by a method described in greater detail below. Step 46 then uses the coarse approximation to calculate a phase difference signal such as the signal 24 of FIG. 2.

The calculated phase difference signal and the measured phase differences from step 42 are then coupled to the reconstruction step 48 which reconstructs a phase difference signal for a revolution of the antenna pair using the measured phase differences and the calculated phase difference signal. The reconstructed phase signal and the calculated phase signal are then coupled to a pair of identical differentiation steps 50,51 which calculate the first derivative of each of their respective signals starting at the first zero crossing and wrapping around the end of the sample record back to this point.

These calculated derivatives are then coupled to a compare step 52 which looks for significant differences between the first derivatives. When significant differences are detected, step 54 adjusts or corrects the values of the reconstructed phase difference signal from step 48 in an attempt to improve that reconstruction.

Using the adjusted reconstructed signal, step 56 makes a fine determination of the direction of origin of the transmission signal. This fine determination is available for output on line 58 and is also coupled along with the adjusted reconstructed signal to the error determination step 60.

Error determination step 60 determines the amount of error existing between the adjusted reconstructed signal and a nominal phase difference signal generated from the fine direction estimate. If the determined error is below a predetermined threshold, a pass or acceptance signal is generated which verifies the fine direction estimate on line 58. If the determined error is greater than a predetermined threshold, step 62 is implemented to adjust the coarse direction estimate determined in step 44. This causes all of the process steps of 46 through 62 to be repeated until the error determination step 60 indicates an error in the fine direction estimate which is less than the predetermined threshold.

When the fine direction estimate does pass Error step 60, step 64 uses the fine direction estimate to determine the elevation phi 23 of the received transmission signal with respect to the plane of the spinning antenna pair.

Figure 5:
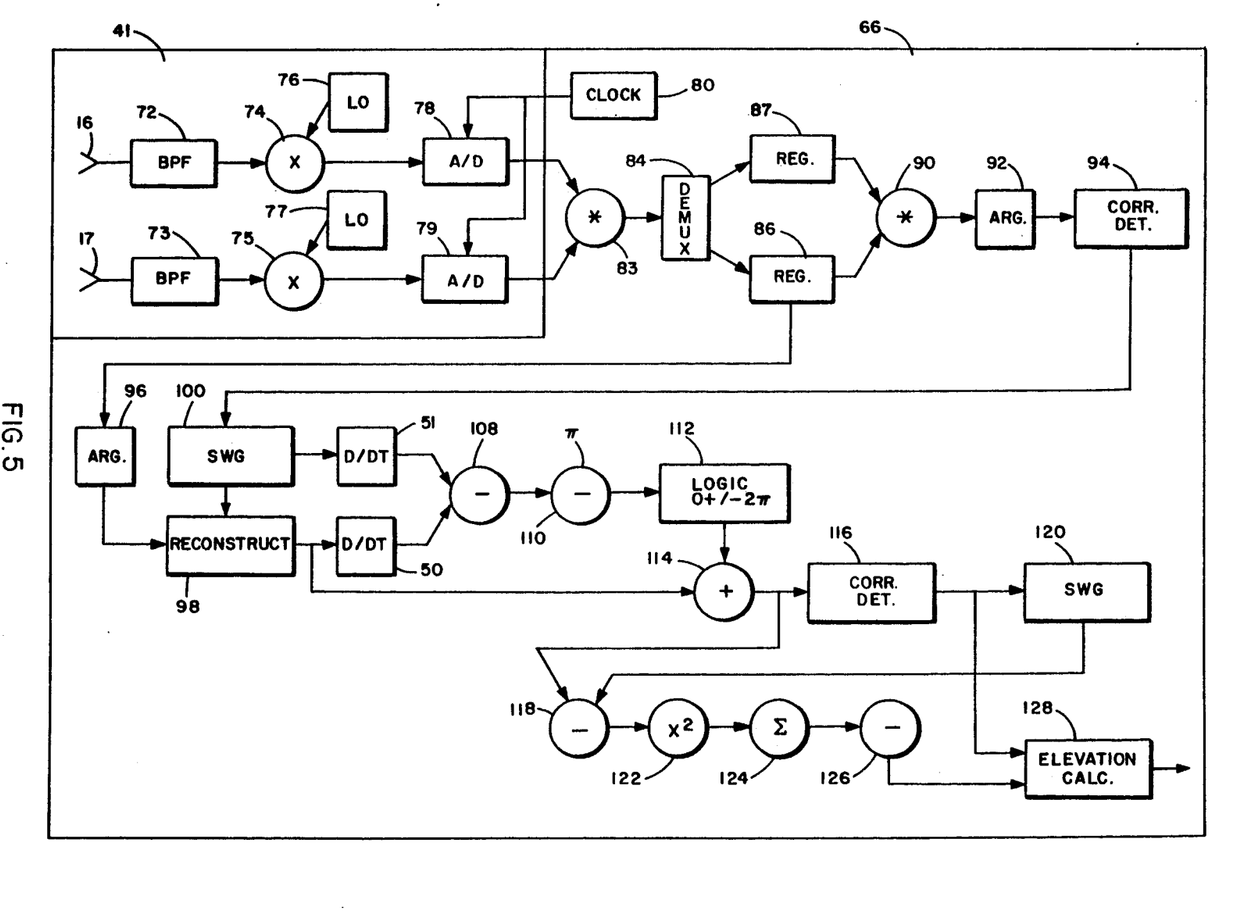
FIG. 5 is a schematic block diagram of another embodiment of the present invention.

FIG. 5 shows a more detailed schematic block diagram of an embodiment of the present invention which implements the method described in reference to FIG. 4. Generally, the step 41 of receiving and digitizing the received signals from the spinning antenna pair is performed by the components located in block 41 of FIG. 5. Included are the spinning antenna pair 16,17 the outputs of which are connected to a respective pair of bandpass filters 72,73. The filtered signals are coupled to a pair of mixers 74,75 which also receive signals from a pair of local oscillators 76,77, to transform the filtered signals down to a passband where they may be more readily digitally sampled. The pass band of filters 72,73 and the frequency of the local oscillators thereby determine the frequency of the received transmission signal.

The sampling is performed by a pair of analog to digital (A/D) converters 78,79, the operation of which is controlled by a clock 80 to derive the appropriate samples with respect to the rotation of the antenna pair and the frequency of the received transmission signal.

The remainder of the components of FIG. 5 located in block 66, may be replaced by a computer programmed to perform the functions set forth in reference to FIG. 4, steps 42 through 64.

A/D converters 78,79 are sampled simultaneously to measure signals simultaneously received by the antennas 16,17. The sampling is performed at a predetermined number of angular locations 81 of FIG. 2, within a rotation of the antenna pair and at a multiplicity of additional rotational positions 82 of FIG. 2, each of which is separated from a separate one of the predetermined number of angular locations 81 by a timing period approximately equivalent to pi radians or 180 degrees of the received transmission signal phase difference between antennas. Both the predetermined number of locations 81 and the multiplicity of additional positions 82 includes a pair of samples of the antenna voltages taken at relative quadrature positions to form a complex voltage sample. The quadrature positions are determined by a phase shift of 90 degrees or pi/2 radians of the received transmission signal frequency.

The sampled signals are then coupled to complex conjugate multiplier 83 which multiplies each sample from antenna 16 times the complex conjugate of the corresponding sample from antenna 17 for the simultaneously received signals for each angular location 81 and each rotational position 82 to produce the complex conjugate product of the signals simultaneously received by both of the antennas. The phase angle of the complex product of multiplier 83 equals the phase difference between the simultaneously received signals.

The resulting data is then coupled to a demultiplexer 84 which separates the phase differences for the predetermined number of angular locations 81 of the antenna rotation from the phase differences of the multiplicity of additional rotational positions 82, coupling them to a pair of registers 86,87 respectively.

For the purpose of producing the coarse direction estimate, the phase differences at the predetermined number of angular locations 81 from register 86 are then transferred with their corresponding ones of the phase differences at the multiplicity of additional rotational positions 82 from register 87 to a complex conjugate multiplier 90 which produces a complex number indicative of the phase shift therebetween. This complex number is coupled to an argument calculator 92 which determines the phase angle of each complex number. The combination of phase angles represents a phase signal which is then coupled to the correlation detector 94. Correlation detector 94 calculates the amplitude and phase angle of the phase difference signal. This phase angle represents the rotational phase of the spinning antenna pair with respect to the received transmission signal and constitutes the coarse estimate of the azimuth theta 23 of origin of the transmission signal. The amplitude produced by correlation detector 94 is indicative of the elevation phi 23 of the signal source 14.

While the coarse estimate is being made, the phase differences measured at the predetermined number of angular locations 81 from register 86 are coupled through another argument calculator 96 which determines the phase angles represented by those complex numbers. The measured phase differences so calculated represent the signal 30 of FIG. 3 and are coupled to a reconstruction calculator 98 corresponding to the reconstruction process step 48 of FIG. 4. Also coupled to reconstruction calculator 98 are calculated values for a phase signal produced in a sine wave generator 100 in response to the amplitude and phase angles determined by correlation detector 94. It is within the reconstruction calculator 98 that an attempt is made at reconstructing the phase signal 28 of FIG. 3.

As previously explained, the calculated phase differences produced by the argument calculator 96 are constrained within the limits of +/− pi. To effect the reconstruction process, the readings for each of the angular locations 81 are adjusted until they are within 2pi radians of the corresponding coarse estimate values produced by sine wave generator 100. This adjustment is accomplished by repetitively adding 2pi radians to phase angle calculated for each angular location 81 until that reading is within range of the corresponding reading from sine wave generator 100. Another method of accomplishing the same result is to determine the difference between each measured phase difference from calculator 96 and its corresponding estimate value from generator 100. This difference is then divided by 2pi and the integer value or the quotient represents the number of 2pis intervals separating the measured phase difference from the calculated phase difference. This integer value is then multiplied by 2pi and added to the measured phase difference.

For the purpose of correcting individual values of the reconstructed phase difference signal, corresponding values of the reconstructed phase signal produced by calculator 98 and the calculated phase signal from generator 100 are then simultaneously coupled to a pair of differentiators 50,51 which produce the first derivative of the respective phase difference signals. The corresponding points of the first derivatives are then coupled to a subtractor 108. The output of subtractor 108 represents the difference between respective points of the first derivatives of the reconstructed phase signal and the calculated phase signal based upon the coarse direction estimate. It is from these difference measurements that an additional pi radians is subtracted by a following subtractor 110. The output of subtractor 110 is then used to determine whether the respective points of the reconstructed phase difference signal are adjusted. This step is performed by a logic circuit 112 and an adder 114.

Logic circuit 112 determines a correction factor which will be added to the specific point on the phase difference signal corresponding to the tested limit of the first derivative. Where the difference between the derivatives is sufficiently small, a zero is coupled from logic circuit 112 to adder 114. When the slope of the reconstructed phase signal is either more negative or less positive than the slope of the calculated signal by a sufficient amount, then 2pi radians are added to the specific point of the reconstructed phase difference signal which caused the indication. When the reconstructed signal is either more positive or less negative by a sufficient amount than the slope of the calculated phase signal, then −2pi radians are added to the specific point of the reconstructed phase difference signal at the point causing the indication.

With the reconstructed phase signal so corrected, it is then coupled to another correlation detector 116. Correlation detector 116 makes a refined direction estimate based upon the corrected and thereby reshaped reconstructed phase signal. The refined direction estimate is in the form of an amplitude and phase angle.

For the purpose of determining accuracy, the resulting refined direction estimate is then coupled to a sine wave generator 120. Sine wave generator 120 produces an idealized phase signal, based upon the refined direction estimate. This idealized phase signal is then coupled point by point to a subtractor 118 where it is subtracted from the corresponding points of the adjusted reconstructed phase signal. The individual differences or errors produced therefrom are then squared in a multiplier 122 and summed in an adder 124 to determine the overall error of the refined direction estimate. This overall error is then tested against a predetermined threshold value by a subtractor 126. If the overall error is less than the predetermined threshold, the amplitude and phase angle estimates from correlation detector 116 are accepted as final. If the calculated error exceeds the predetermined threshold, a slightly different coarse direction estimate is coupled to the sine wave generator 100 and the reconstruction, correction and error measurement process is reiterated until the calculated error falls below the predetermined threshold. Whereas it is accepted that the amplitude and phase angle of the coarse direction estimate produced by correlation detector 94 have only a limited degree of accuracy, adjustments to that coarse direction estimate within the degree of accuracy of the initial estimate, may be made while still remaining consistent with the initial estimate.

Once the fine direction estimate is accepted as final it is coupled to an elevation calculator 128 where it is used to determine the elevation angle phi 23 of the signal source 14 with respect to the plane of rotation of the antenna pair. The angle phi 23 is equal to the arc cosine of the amplitude times the wavelength 22 divided by the product of 2pi and the antenna separation 20.

Figure 6:
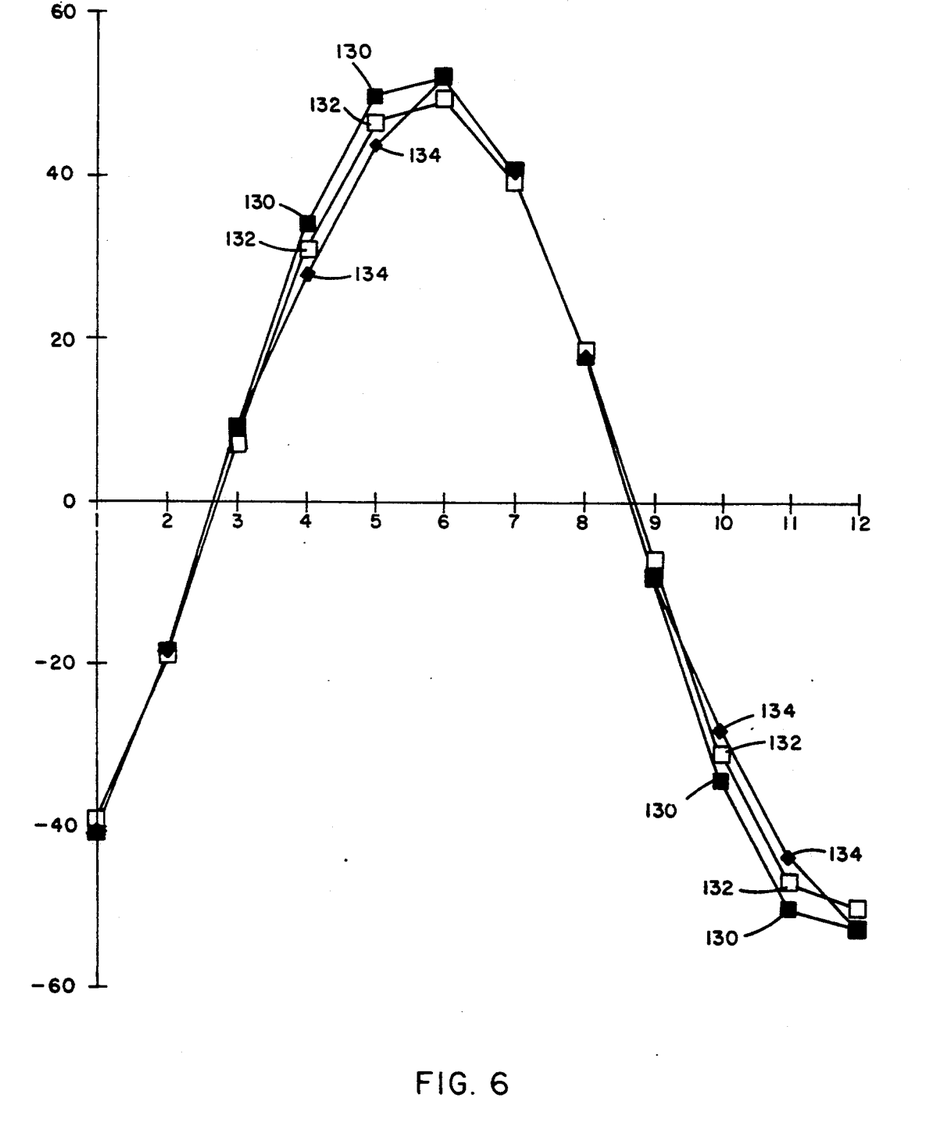
FIGS. 6 and 7 are graphs of phase difference signals depicting the operation of an embodiment of the present invention.

The process of correcting individual values of the reconstructed phase signal is illustrated by FIG. 6 which plots three waveforms. The black squares 130 plot the actual phase difference between signals in the absence of noise. The white squares 132 plot a phase difference signal calculated from the coarse direction estimate. The diamonds 134 plot the corresponding reconstructed phase signal prior to correction. These three wave forms are plotted, like the other figures, with the rotational position of the antenna pair along the horizontal axis and the phase difference in radians along the vertical axis. The horizontal axis is marked with twelve sampling points which represent the predetermined number of approximately evenly spaced angular locations 81 within a revolution of the spinning antenna pair.

In this example of the reconstructed waveform 134, the points 4, 5, 10 and 11 are in error. While these points have been offset by enough multiples of 2pi to minimize their error with respect to the coarse estimate 132, the reconstructed phase signal 134 is still too poor to allow correct fitting near the peaks of the sinusoid. This condition is detected by the present invention by comparison of the slopes of the reconstructed waveform 134 and the coarse estimate waveform 132. It can be readily seen that the slope of waveforms 132 and 134 differ significantly between sampling points 3 and 4 and sampling points 5 and 6.

Figure 7:
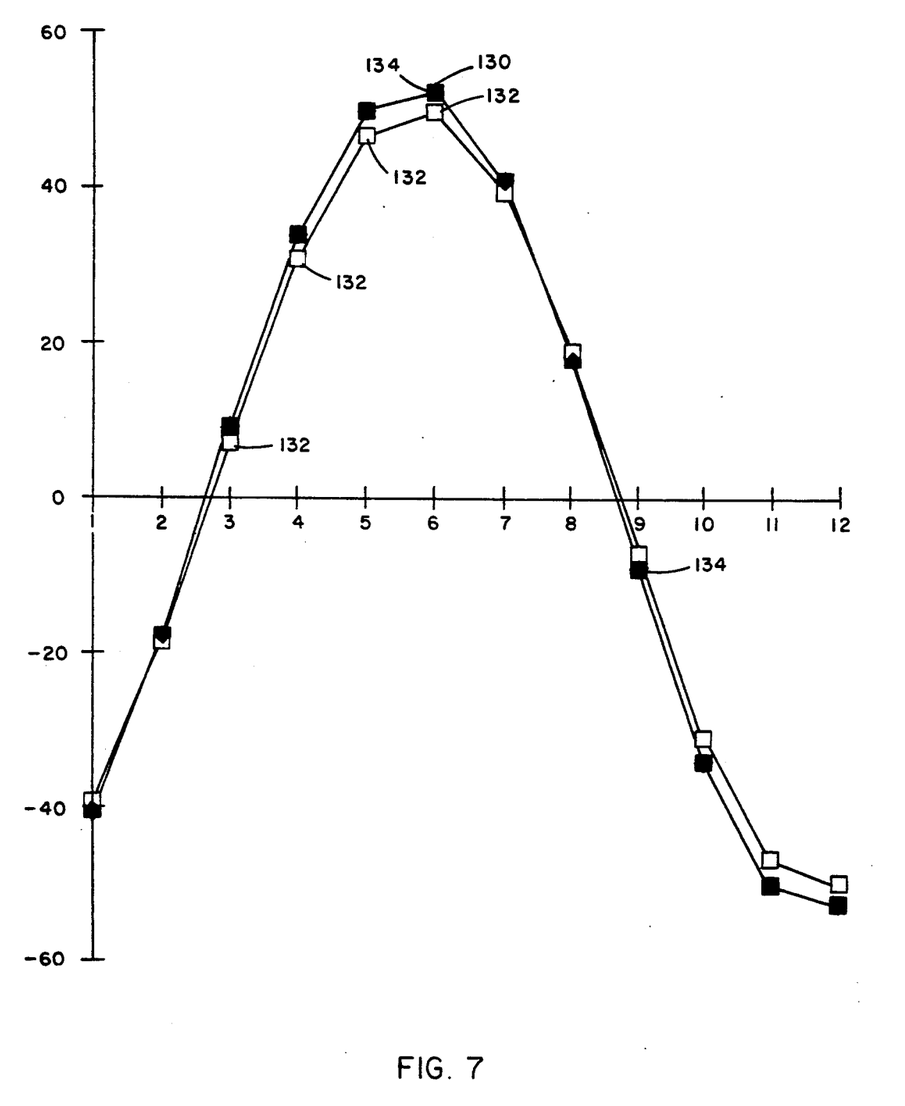

Corrections to the individual phase differences ma be made by different methods. In the previously described embodiments, when the slope of reconstructed waveform 134 is less positive than the slope of the calculated or coarse estimate waveform 132, as is the case between sampling points 3 and 4, then 2pi radians are added to the reconstructed waveform at point 4. This raises point 4 to approximately the level of the actual phase difference of waveform 130. When the slope between sampling points 4 and 5 is determined, the same condition persists as the point 4 of reconstructed waveform 134 has been raised. This condition results in the further adding of 2pi radians to the phase difference at sampling point 5 of the reconstructed waveform 134. In a software embodiment of this step of the present invention, the differences in slopes between points 3 and 4, and 5 and 6, could be detected and the corresponding intermediate points 4 and 5 adjusted accordingly. FIG. 7 shows the waveforms of FIG. 6 after the correction of points 4, 5, 10 and 11 with the diamonds 134 almost exactly following the actual phase difference waveform 130.

CONCLUSION

The direction finding apparatus and method of the present invention provides significant improvements in the efficiency of the required apparatus and processing by greatly reducing the number of samples required from a spinning antenna pair for determining direction. This reduced number of samples enables a separation to be used for the antenna pair which is many times the wavelength of the signal being received, thus providing a very high degree of accuracy to the determined direction of origin of the transmitted signal.

The embodiments described above are intended to be taken in an illustrative and not a limiting sense. Various modifications and changes may be made to the above embodiments by persons skilled in the art without departing from the scope of the present invention as defined in the appended claims.

What is claimed is:

1. A method for determining the direction of origin of a received transmission signal using the phase differences provided by receiving the signal with a spinning pair of antennas, comprising the steps of:

measuring the phase difference between the signals received simultaneously by a spinning antenna pair for a single transmission signal, at a predetermined number of approximately evenly spaced angular positions within a revolution of the spinning antenna pair;

coarsely approximating the direction of origin of the transmission signal based upon the measured phase differences;

calculating a first phase difference signal based upon the coarsely approximated direction;

reconstructing a phase difference signal using the phase differences measured from the antenna pair and the calculated phase difference signal;

determining the first time derivatives of the reconstructed phase signal and the calculated phase signal;

correcting the reconstructed phase signal in response to a comparison between the first derivatives of the reconstructed phase signal and the calculated phase signal;

finely determining the direction of origin of the transmission signal based upon the corrected reconstructed phase signal.

2. The method of claim 1, further comprising the steps of:

calculating a second phase signal based upon the finely determined direction;

determining the error of the finely determined direction by comparing the corrected reconstructed phase signal against the second calculated phase signal; and repeating the previous steps from the first step of calculating a first phase signal based upon an adjusted approximated direction unless the determined error of the finely determined direction is below a predetermined threshold value.

3. The method of claim 2, wherein the step of repeating the previous steps includes adjusting the approximated direction within a known range of accuracy for the step of coarsely approximating.

4. The method of claim 1, wherein the step of correcting the reconstructed phase signal is accomplished by adding or subtracting 2pi radians to individual values of the reconstructed phase signal for which the compared first derivatives differ by more than a second predetermined threshold value.

5. The method of claim 1, wherein the reconstruction is performed by taking the integer value of the difference between the measured phase differences and the calculated phase signal divided by 2pi, multiplying that integer value by 2pi and adding the resulting product to the measured phase differences.

6. The method of claim 1, wherein phase differences are measured and phase signals are calculated and reconstructed for approximately one revolution of the antenna pair.

7. An apparatus for determining the direction of origin of a transmission signal, comprising:

means for receiving a transmission signal with a spinning antenna pair;

means for measuring the phase difference between signals received simultaneously by the antenna pair at a predetermined number of approximately evenly spaced angular positions within a revolution of the spinning antenna pair;

means for coarsely approximating the direction of origin of the transmission signal;

means for calculating a first phase difference signal based upon the approximated direction;

means for reconstructing a phase difference signal using the phase differences measured from the antenna pair and the first calculated first phase difference signal;

means for determining the first time derivatives of the reconstructed phase signal and the calculated first phase signal;

means for correcting the reconstructed phase signal in response to a comparison between the first derivatives of the reconstructed phase signal and the calculated first phase signal; and means for finely determining the direction of origin of the transmission signal based upon the corrected reconstructed phase signal.

8. The apparatus of claim 7, further comprising:

means for calculating a second phase signal based upon the finely determined direction of origin;

means for determining the error of the finely determined direction including means for comparing the corrected reconstructed phase signal against the second calculated phase signal; and means for providing to the means for calculating a first phase signal, an adjusted coarsely approximated direction unless the determined error of the finely determined direction is below a predetermined threshold value.

9. The apparatus of claim 7, wherein the means for correcting includes means for adjusting individual phase values of the reconstructed phase signal.

10. The apparatus of claim 7, wherein the means for correcting the reconstructed phase signal includes means for adding or subtracting 2pi radians to individual values of the reconstructed phase signal for which the compared first derivatives differ by more than a second predetermined threshold value.

11. An apparatus for determining the direction of origin of a transmission signal, comprising:

means for receiving a transmission signal with a spinning antenna pair;

means for simultaneously sampling signals received by the antenna pair; and programmed computational means coupled to receive the sampled signals and including instructional means for:

measuring the phase difference between the signals received simultaneously by a spinning antenna pair for a single transmission signal, at a predetermined number of approximately evenly spaced angular positions within a revolution of the spinning antenna pair;

coarsely approximating the direction of origin of the transmission signal based upon the measured phase differences;

calculating a first phase difference signal based upon the coarsely approximated direction;

reconstructing a phase difference signal using the phase differences measured from the antenna pair and the calculated phase difference signal;

determining the first time derivatives of the reconstructed phase signal and the calculated phase signal;

correcting the reconstructed phase signal in response to a comparison between the first derivatives of the reconstructed phase signal and the calculated phase signal; and finely determining the direction of origin of the transmission signal based upon the corrected reconstructed phase signal.

12. The apparatus of claim 1, wherein the computational means further includes instructional means for:

calculating a second phase signal based upon the finely determined direction;

determining the error of the finely determined direction by comparing the corrected reconstructed phase signal against the second calculated phase signal; and repeating the previous steps from the first step of calculating a first phase signal based upon an adjusted approximated direction unless the determined error of the finely determined direction is below a predetermined threshold value.

13. The apparatus of claim 12, wherein the instructional means for repeating the previous steps includes adjusting the approximated direction within a known range of accuracy for the instructional means for coarsely approximating.

14. The apparatus of claim 11, wherein the instructional means for correcting the reconstructed phase signal is accomplished by adding or subtracting 2pi radians to individual values of the reconstructed phase signal for which the compared first derivatives differ by more than a second predetermined threshold value.

15. The apparatus of claim 11, wherein the reconstruction is performed by taking the integer value of the difference between the measured phase differences and the calculated phase signal divided by 2pi, multiplying that integer value by 2pi and adding the resulting product to the measured phase differences.

* * * * *